United States Patent Office 3,461,994
Patented Aug. 19, 1969

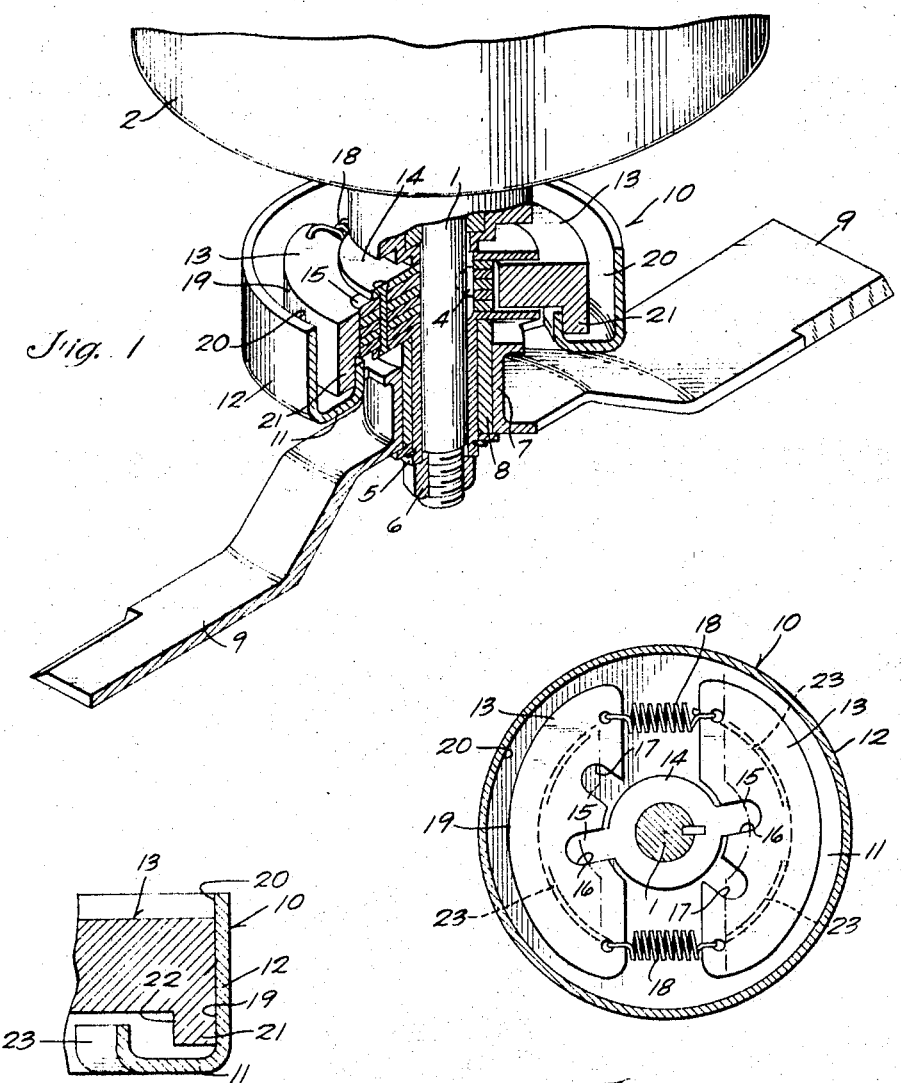

3,461,994
CENTRIFUGAL CLUTCH AND BRAKE
Robert J. Dallman, Shorewood, and Anthony L. Haag, Cedarburg, Wis., assignors to North American Clutch Corporation, Milwaukee, Wis., a corporation of Wisconsin
Filed Sept. 1, 1967, Ser. No. 665,053
Int. Cl. F16d 23/10, 43/24
U.S. Cl. 192—105                5 Claims

ABSTRACT OF THE DISCLOSURE

This invention relates to a centrifugal clutch and brake construction for a rotating element. The invention includes a series of clutch shoes associated with a drive shaft or rotor, and as the rotor rotates, the shoes move outwardly by centrifugal force to force the outer surface of each shoe into contact with an inner surface of a driven rotor or drum connected to the rotating element, to thereby drive the element. In addition, each shoe is provided with an inner surface adapted to engage an outwardly facing surface of the drum as the shoes move inwardly when rotation of the drive shaft ceases and engagement of these surfaces provides a braking action to prevent free wheeling of the rotating element.

---

On starting of the engine, the brake action disengages after two or three revolutions and this reduces the starting load. As the speed of the engine increases, the clutch shoes will move into full clutch engagement with the rotor to drive the rotor.

It is desirable for power driven rotating elements, such as mower blades, snow thrower impellers, and the like, to include a clutch mechanism which, when disengaged, reduces the load on the engine during starting and prevents overloading of the motor during operation. If a clutch is incorporated with the power driven mechanism, a braking device is normally incorporated to prevent free wheeling of the rotating element when the engine is stopped. For example, if a clutch is associated with the drive mechanism of a rotary lawn mower, the mower blade may rotate for several minutes after the clutch is disengaged and this provides a definite hazard in that the operator may insert his hand within the blade housing thinking the blade has stopped rotation. Therefore from a safety standpoint, a braking mechanism is normally employed in conjunction with a clutch.

While more expensive power driven units include a clutch and brake, many lawn mowers and other inexpensive power driven equipment do not include a clutch and brake because of the cost involved.

The present invention is directed to an inexpensive centrifugal clutch and braking unit for a rotating element. More specifically, the clutch includes a series of shoes operably connected to the drive shaft or drive rotor, and as the drive shaft rotates, the shoes move outwardly by centrifugal force to bring the outer driving surface of the shoe into engagement with an inner surface of a drum or driven rotor which is operably connected to the rotating element so that rotation of the shoes is transmitted through the drum to rotate the rotating element.

In addition, the shoes are provided with an axially extending flange which defines an inner braking surface, and when the engine is stopped the shoes are urged radially inward, and the braking surface engages an outwardly facing surface on the drum to provide a frictional braking action which prevents free wheeling of the rotating element.

With the clutch and braking unit of the invention, the clutch is disengaged when the engine is started and this reduces the load on starting. Moreover, the clutch will act to disengage the drive system under overload conditions, such as when a mower blade strikes an object or moves into contact with heavy grass or the like.

The braking mechanism is associated directly with the clutch and prevents free wheeling of the rotating element after the clutch is disengaged and the engine is stopped. The braking mechanism is relatively inexpenesive and does not require any additional parts, over and above that which are required for the clutch. This results in the unit being particularly suitable for use with relatively inexpenesive power equipment.

Other objects and advantages will appear in the course of the following description.

The drawings illustrate the best mode presently contemplated of carrying out the invention.

In the drawings:

FIG. 1 is a fragmentary perspective view with parts broken away in section of a conventional rotary lawn mower embodying the clutch and brake unit of the invention;

FIG. 2 is a transverse section showing the clutch shoes;

FIG. 3 is an enlarged fragmentary vertical section showing the clutch in the engaged position and the brake in the disengaged position; and FIG. 4 is a view similar to FIG. 3 showing a modified form of the invention.

The drawings illustrate the clutch and brake unit of the invention as applied to a conventional rotary power lawn mower. The mower includes a drive shaft 1 which is driven by a gasoline engine 2 and the lower end of drive shaft 1 is secured within a sleeve 3 by a key 4. To retain the sleeve 3 on the drive shaft 1, the lower end of the shaft 1 is threaded and receives a washer 5 and a nut 6.

An annular hub 7 is journaled about the sleeve 3 by a bearing 8, and a pair of mower blades 9 is connected to the hub 7. The blades 9 are mounted within a housing or shroud, not shown, and during operation rotate about the axis of drive shaft 1.

Connected integrally with the hub 7 is a cup-shaped drum 10 which includes a bottom wall 11 secured to hub 7 and an annular side wall or flange 12.

A pair of clutch shoes 13 is located radially inward of the side wall 12 of drum 10, and the shoes 13 are movable in a radial direction within a central hub or rotor 14 attached to the sleeve 3. The rotor 14 has a generally U-shaped cross section and shoes 13 are positioned within the upper and lower flanges of the rotor.

The shoes 13 are driven in accordance with rotation of the rotor 14 by a pair of driving projections 15 which extend radially outward from the rotor 14 and are received within one of a pair of grooves 16 and 17 formed in the inner surface of the respective shoes 13. The connection of the projection 15 with the grooves 16 provides a rotational connection between the rotor 14 and the shoes 13 and yet permits the shoes 13 to move radially outward by centrifugal force.

The driving connection of the rotor 14 to shoes 13 is not critical to the invention, and other driving connections such as that disclosed in Patent 2,942,711 of the same inventor can also be used.

To urge the shoes 13 inwardly toward the axis of the drive shaft 1, a paid of springs 18 are connected between the adjacent ends of the shoes 13. When rotation of the drive shaft 1 is stopped, the force of the springs 18 urges the shoes inwardly within the rotor 14.

As the sleeve 3 is keyed to the drive shaft 1, rotation of the drive shaft 1 will serve to rotate the sleeve 3 and the rotor 14. As the rotor 14 rotates the shoes 13 will be moved outwardly by a centrifugal force and the outer surface 19 of the shoes will engage the inner surface 20 of the side wall 12 of the drum 10 and the frictional contact between the surfaces 19 and 20 will cause the drum 10 to rotate in accordance with rotation of the shoes 13 to thereby provide a driving connection between the members. When rotation of the drive shaft 1 is stopped, the shoes 13 will be moved inwardly by the springs 18 to thereby move the surface 19 out of contact with surface 20 and disengage the driving connection between the members.

To provide a braking force to prevent free wheeling of the blades 9 after the engine 2 is stopped and the clutch is disengaged, the shoes 13 are provided with downwardly extending flanges 21 and as the shoes move radially inward the inner surface 22 on flange 21 engages the outer surfaces of a series of ears 23 projecting upwardly from the bottom wall 11 of drum 10. The frictional engagement of the surface 22 with the ears 23 provides a braking force to prevent free wheeling of the blades 9 as the shoes 13 move inwardly when the engine is stopped.

While the drawings illustrate the ears 23 as being a series of circularly spaced, punched-out portions of the bottom wall 11, it is contemplated that an annular flange or ring may be secured to the bottom wall 11 and a similar braking effect will be provided by engagement of the surface 22 with the ring formed on the bottom wall.

The invention provides an inexpensive braking mechanism associated with a centrifugal clutch which prevents free wheeling of the blades 9 and yet requires no additional parts for the braking action. The flange 21 is an integral part of the clutch shoes 13 and the corresponding braking ears 23 are merely punched out portions of the bottom wall 11 of drum 10.

The use of the centrifugal clutch reduces the starting load on the engine and also serves to disengage the driving connection if the blades 9 should strike an obstruction or engage heavy grass. The brake, which is an integral portion of the clutch unit, will provide a complete stop for the blades in a period of less than 3 seconds after the engine is stopped.

FIG. 4 illustrates a modified form of the invention in which a drum 24, similar to drum 10 of the first embodiment, is provided with a bottom wall 25 and an annular side wall 26. The clutch shoes 27, similar to shoes 13 of the first embodiment, are provided with outwardly facing surfaces 28 which are adapted to frictionally engage the inner surface 29 of the side wall 26 of the drum to provide a driving connection between the clutch shoes and the drum as the shoes move outwardly by centrifugal force.

To provide a braking action for the drum 24 and attached blades 9, the shoes 27 are provided with extensions 30 which are generally U-shaped in cross section. When the shoes 27 move inwardly by the force of the springs 18, when the engine is stopped, the inwardly facing surface 31 on each extension 30 engages the outer surface 32 of the side wall 26 of drum 24 to provide a frictional braking action between the shoes 13 and the drum 24 to thereby prevent free wheeling of the blades 9.

The manner of operation of the unit shown in FIG. 4 is similar to that described with respect to the unit of FIGS. 1–3. As the engine is started, the clutch shoes 27 move outwardly, bringing the surface 28 into frictional engaging contact with the inner surface 29 of the drum to thereby provide a driving connection between the members. When the engine 2 is stopped and the shoes 27 move radially inward, the surface 31 of the shoes engages the outer surface 32 of the side wall 26 of drum 24 to provide a braking effect to prevent free wheeling of the blades.

Various modes of carrying out the invention are contemplated as being within the scope of the following claims particularly pointing out and distinctly claiming the subject matter which is regarded as the invention.

We claim:

1. In a drive system, a driving rotor, a driven rotor spaced radially outward from said driving rotor, clutch means for transmitting torque between the driving rotor and the driven rotor and including a plurality of shoes operably connected to the driving rotor and located within the space between the driving rotor and the driven rotor, and means for urging the shoes radially inward, said driven rotor being generally cup-shaped and including a bottom wall and an annular side wall, said shoes having a first radially outward facing driving surface and said annular side wall of said driven rotor comprising a second radially inward facing driving surface disposed to be engaged by said first driving surface as the shoes move outwardly by centrifugal force to thereby transmit torque from said shoes to the driven rotor, said shoes also having a radially inward facing first braking surface, and an upstanding member connected to said bottom wall and including a radially outward facing second braking surface disposed to be engaged by said first braking surface as the shoes move radially inward to provide a frictional braking effect for the driven rotor, said upstanding member including a series of circumferentially spaced ears projecting axially upward from said bottom wall, and the inner surfaces of said ears comprising said second braking surface.

2. The drive system of claim 1 in which said ear comprises a depending punched-out portion of the bottom wall.

3. In a drive system, a driving rotor, a driven rotor spaced radially outward from said driving rotor, clutch means for transmitting torque between the driving rotor and the driven rotor and including a plurality of shoes operably connected to the driving rotor, means for urging the shoes radially inward, said shoes having a first radially outward facing driving surface and said driven rotor having a second radially inward facing driving surface adapted to be engaged by said first driving surface as the shoes move outwardly by centrifugal force to thereby transmit torque from said shoes to the driven rotor, said shoes being provided with an extension projecting radially outward beyond said first driving surface, said extension including a radially inward facing first braking surface, said driven rotor being provided with a radially outward facing second braking surface disposed to be engaged by said first braking surface as said shoes move radially inward to provide a frictional braking effect on the driven rotor.

4. The drive system of claim 3, wherein said driven rotor is generally cup-shaped and includes a bottom wall and an annular side wall, the inner surface of said side wall comprises said second driving surface and the outer surface of said side wall comprises said second braking surface.

5. In a drive system, a central drive shaft, a generally cup-shaped driven rotor including a bottom wall and an annular side wall, said side wall being spaced radially outward from said drive shaft, clutch means for transmitting torque between the drive shaft and the driven rotor and including a plurality of shoes located within the space between the drive shaft and said side wall, means interconnecting the drive shaft and the inner peripheral portion of said shoes for driving said shoes in accordance with rotation of said shaft, said shoes having a first radially outward facing peripheral drive surface and the inner surface of said side wall of the rotor comprising a second driving surface disposed to be engaged by said first driving surface as the shoes move outwardly by centrifugal force to thereby transmit torque from said shoes to the driven rotor, resilient means for urging the shoes radially inward, a flange projecting axially from said shoes and extending toward said bottom wall, said flange including a radially inward facing first braking surface, and an upstanding member formed on the bottom wall and located radially inward of said flange and including a radially outward facing second braking surface disposed to be engaged by said first braking surface as the shoes move inwardly under the force of said resilient means to thereby prevent free-wheeling of said driven rotor.

References Cited

UNITED STATES PATENTS

| | | |
|---|---|---|
| 2,230,293 | 2/1941 | Harris. |
| 2,448,539 | 9/1948 | Maurer. |
| 2,529,919 | 11/1950 | Cunningham. |
| 2,663,397 | 12/1953 | Scott. |
| 3,393,781 | 7/1968 | Miura. |

FOREIGN PATENTS 1,169,852   9/1958   France.

BENJAMIN W. WYCHE III, Primary Examiner